United States Patent [19]
Israel

[11] 3,732,972
[45] May 15, 1973

[54] WET PALETTE
[75] Inventor: Alfred Israel, New York, N.Y.
[73] Assignee: Archie F. Burger, New York, N.Y.; a part interest
[22] Filed: June 26, 1972
[21] Appl. No.: 266,064

[52] U.S. Cl. ................................................. 206/1.7
[51] Int. Cl. ............................................... B44d 3/02
[58] Field of Search ..................... 206/1.7; 312/231

[56] References Cited
UNITED STATES PATENTS

| | | |
|---|---|---|
| 2,711,605 | 6/1955 | Dripps ..................................... 206/1.7 |
| 3,023,884 | 3/1962 | Schwartz ................................ 206/1.7 |
| 3,352,616 | 11/1967 | Linger ..................................... 312/231 |
| 3,428,167 | 2/1969 | Sheng ..................................... 206/1.7 |

*Primary Examiner*—Leonard Summer
*Attorney*—Sydney B. Schlessel

[57] ABSTRACT

A wet pallette comprising a flat base integral with a peripheral wall, with a portion of the wall extending over a portion of the base to form an overhang in spaced, parallel relationship thereto. A water retentive pad is disposed across the base and beneath the overhang. A plurality of pigment containers are seated in the overhang and fit into openings in the pad. A water-permeable sheet overlies the pad and overhang, surrounding the pigment containers, and providing an area on which selected pigments may be placed and mixed. A flexible sleeve is used to encase the palette when not in use, to prevent dehydration.

9 Claims, 7 Drawing Figures

PATENTED MAY 15 1973 3,732,972
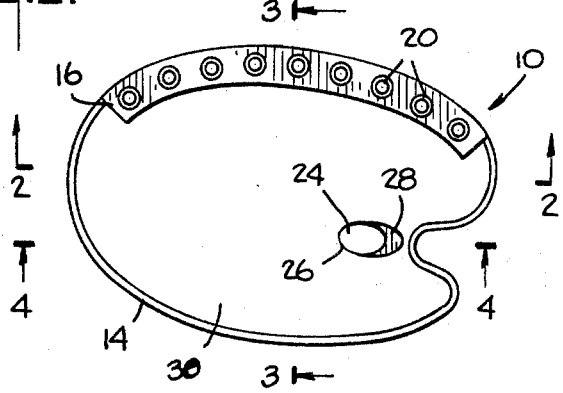
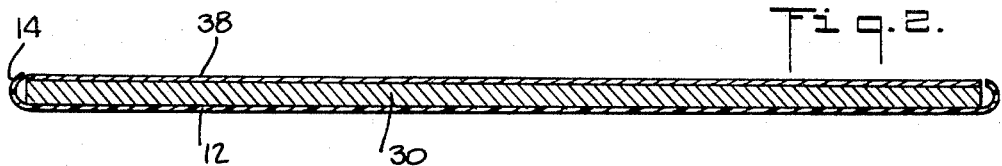
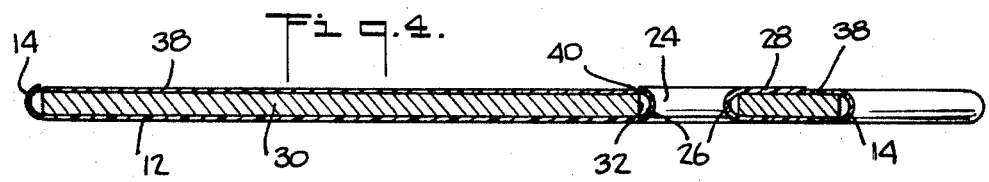
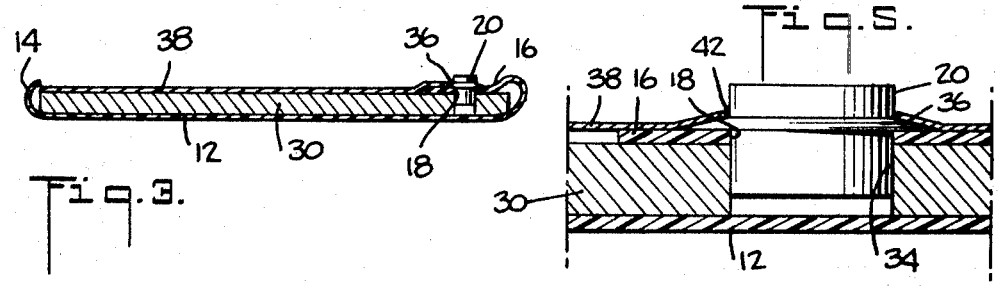
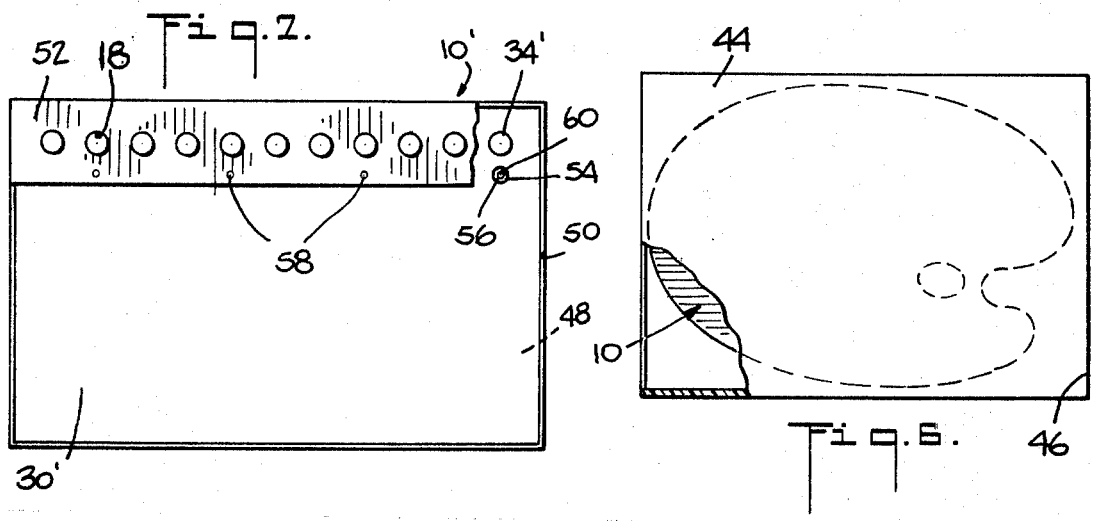

WET PALETTE

BACKGROUND OF THE INVENTION a. Field of the Invention

This invention relates to the field of art and painting, and has for its objective the creation of artists' palettes, each of which consists of an area for the retention of a plurality of basic pigments of various colors and an area for mixing selected pigments to vary these colors, from the basic pigments, with the palette being of such construction and composition that both the basic pigments and the mixtures are prevented from losing moisture over a period of prolonged use, thereby permitting more effective use of the pigments over extended periods of time. A further object is to provide an unique enclosure for the palette, when not in use, whereby the working areas of the palette are effectively sealed off from exposure to air, thereby preventing dehydration of the pigments. This type of palette is most effective with the use of Acrylic-polymers, which are presently coming into extensive use by artists and which, unlike oils, tend to lose moisture and dry out much more rapidly.

b. Prior Art

In the present state of the art artists' palettes are generally constructed with flat surfaces, having an area on which basic colors are deposited, and an area for mixing selected colors for variations thereof. As the artist works, the pigments and mixtures are exposed to the air, and the moisture originally contained in them tends to evaporate very quickly, causing them to dry out and thereby become ineffective for use. The artist is thus compelled to mist his colors frequently, more so with Acrylic paints than with oil paints. He is also compelled to work more rapidly than is desirable, competing against the dehydration process.

Present types of artists' palettes have no means to retain the pigments and mixtures in a continuously moisturized state, nor for protecting the pigments on the palette from exposure and dehydration when the palette is temporarily not in use. These disadvantages are obviated with the present invention.

BRIEF SUMMARY OF THE INVENTION

My invention encompasses the provision of an artist's palette comprising a flat base and a peripheral wall integral therewith and provided with an overhang at one end thereof, with a series of openings in the overhang to seat a plurality of pigment containers, in combination with a moisturized pad disposed over the palette base, including the area beneath the overhang, whereby the pigment containers are imbedded in corresponding openings in the pad, so that the moisture contained in the pad is adapted to permeate, or seep through, the pigment containers to keep the pigments suitably moisturized so long as the pad contains moisture. A layer of porous material, having the contour of the palette, and with corresponding openings, is laid over the pad and overhang, to permit access to the pigment containers and to provide an area for mixing paints. This porous material, which may be paper or the like, is provided in pad form, so that a layer thereof may be superposed over the palette for use, and then discarded when its function has been completed. A further feature of my invention is the provision of a sleeve adapted to enclose the palette, when not in use, to prevent dehydration of the contents.

The principal object of my invention, therefore, lies in the provision of an artist palette provided with a contained moisturizing pad confined within the peripheral wall of the palette and adapted to contact the pigments contained thereon, to prevent dehydration.

A second important object of my invention lies in the provision of a palette of the type above described, of which the mixing area is provided with a removable porous layer of material, which is removable and disposable, thereby eliminating the tedious task of cleaning the palette after each use.

A third important object of my invention lies in the provision of a cover or housing for the palette, when not in use, to prevent exposure and dehydration of the pigments and mixtures.

Still another important object of my invention lies in the provision of a palette and housing therefore which are inexpensive to manufacture and simple to use.

These and other salient objects, advantages and functional features of my invention, together with the novel features of construction, composition and arrangement of parts, will be more readily apparent from an examination of the following specification, taken with the accompanying drawings, wherein:

BRIEF DESCRIPTION OF THE DRAWINGS

FIG. 1 is a top view of a preferred embodiment of my invention, with the top sheet removed;

FIG. 2 is an enlarged cross-sectional view, taken on lines 2—2 of FIG. 1, with top sheet in place;

FIG. 3 is an enlarged cross-sectional view, taken on lines 3—3 of FIG. 1, with top sheet in place;

FIG. 4 is an enlarged cross-sectional view, taken on lines 4—4 of FIG. 1, with top sheet in place;

FIG. 5 is a greatly enlarged, cross-sectional view of a portion of FIG. 3, showing the disposition of a pigment container in the palette overhang;

FIG. 6 is a view similar to FIG. 1, showing the palette encased in a protective sleeve, partly in section, and FIG. 7 is a top view, partly in section, of a modified embodiment of my invention.

Similar reference characters designate similar parts throughout the different views.

DETAILED DESCRIPTION OF THE INVENTION

Illustrative of the embodiment shown by FIGS. 1–5, there is shown an arm palette 10 comprising a flat base 12 provided integrally with a curved peripheral wall 14, the wall 14 curving into an overhang 16 along one side thereof and extending parallel to and partially across the base 12. The overhang 16 is provided with a plurality of spaced openings 18, each of which is adapted to seat a pigment container 20. Centrally of the palette 10, and adjacent a out, as at 22, as is well known in the art, there is provided a finger or thumb opening 24 in the base 12, defined by a circular wall 26 extending at one side into a ledge 28 adapted to support the artist's thumb when extended through the opening 22 to grasp and hold the palette between the artist's hand and arm.

The palette 10 is preferably molded as a complete unit, from plastic or similarly suitable material, including in the unit the base 12, wall 14, overhang 16, and combination wall and ledge 26 and 28.

Disposed over the entire base 12, including the area beneath the overhang 16, and slightly spaced from the peripheral wall 14, there is provided a moisturizing pad 30, made of a fibrous material or a sponge-like material adapted to absorb and retain liquid. The pad 30 may be formed of foam rubber, felt, or any similarly constituted natural or synthetic material. The pad 30 is provided with an opening 32 adapted to enclose the wall 26, and a plurality of spaced openings 34 adapted to come in registry with the openings 18 in the overhang 16, these openings 34 being slightly smaller in diameter than the openings 18, for reasons which will hereinafter appear.

Each of the pigment containers 20, which are shown of circular configuration but which may be of any other shape, provided the openings 18 and 34 are similarly shaped, is composed of a fibrous material capable of absorbing water and the like, such as cardboard, etc., and is provided with an annular apron 36, tapered as shown, by which it is adapted to be seated in an opening 18 in the overhang 16, with the lower portion of the cup 20 pressed into the slightly smaller opening 34 so that it may be firmly retained therein. The porosity of the containers 20 is such that the pigments, because of their greater density, are unable to pass therethrough.

In combination with the palette 10 there is provided a plurality of sheets or layers 38 of porous material, such as paper or the like, which may be bound together in a pad, with a single sheet 38 selectively used. As shown in FIGS. 1-5, each sheet 38 has the same configuration as the palette 10, with openings similar to those in the pad 30, so that a sheet 38 may be overlaid over the entire palette 10, including the overhang 16, and to surround the containers 20, all within the peripheral wall 14. As is to be noted by FIG. 5, the sheet 38 covers the container aprons 36, so that if any paint drips from a container 20 it will drop onto the sheet 38 and thereby protect the apron 36. It is also to be noted that the openings 40 and 42 in the sheet 38 correspond, respectively, to the openings 32 and 34 in the pad 30.

In FIG. 6 there is shown the palette 10 of FIG. 1 encased in an enveloping sleeve 44, which is shown rectangular but which may be of any shape, and which is composed of a flexible plastic material, preferably, although not necessarily transparent. The sleeve 44 is provided with an open end 46 through which the palette 10 is inserted, and is of internal height to frictionally engage the upper edge of the wall 14, so that, when the palette 10 is fully encased within the sleeve 46, the internal area of the palette 10 is closed off from air, thereby preventing dehydration of the pad 30, and maintaining the enclosed pigments and mixtures in workable state.

Coming now to FIG. 7, there is shown a top view, partly in section, of a modified embodiment of my invention, which comprises a rectangular table palette 10' defined by a flat base 48 integral with a curved peripheral wall 50, similar in contour to the wall 14 shown in FIGS. 1-5, continuing into a rectangular overhang 52 extending from the side of the wall 50 across a portion of the base 48, parallel thereto and spaced therefrom, as shown. The overhang 52 is supported over the base 48 by means of a series of spaced pegs 54 integral with the base 48, and which are provided with shoulders formed by reduced heads 56 adapted to fit into bores 58 in the overhang 52, to support the latter over the base 48. The overhang 52 is provided with a plurality of spaced openings 18 adapted each to seat a container 20. In combination with the palette 10' there is provided a moisturizing pad 30' provided with a plurality of spaced openings 34' adapted to be in registry with the openings 18 for the seating of the containers 20, as well as a second series of openings 60 adapted to enclose the pegs 54, the pad 30' sized slightly smaller than the base 48 to allow a spacing thereof therefrom the wall 50, as shown. With this embodiment, as with the embodiment of FIGS.1-5, there are provided a supply of work sheets (not shown) similar to the sheets 38 but configured and with openings suitable for the palette 10', to overlay the palette 10' as the sheet 38 is overlaid over the palette 10.

OPERATION OF THE INVENTION

When the artist is prepared to use the palette 10, as shown in FIGS.1-5, he first removes the pad 30, wets it well with water, and replaces it within the palette 10. Pigment containers 20 are filled with appropriate pigments and secured within the openings 18 in the overhang 16 and with their bases on contact with the pad 30. A sheet 38 is placed across the top of the pad 30 and the overhang 16, surrounding the containers 20. The artist is then prepared to mix his colors and start to work. When he wishes to stop work for any period of time he encloses the palette 10 in a sleeve 44 to protect the pigments from dehydration.

The same procedure is followed with the use of the table palette 10', excepting that, for the removal and reinsertion of the pad 30', the overhang 52 is lifted from the pegs 54 and the applicable section of the pad 30' is passed through between them.

While there is shown and described only a sleeve 44 for the palette 10, it is obvious that a sleeve of similar construction but of appropriate configuration and size is utilized for the palette 10', when not in use.

It is also obvious, with either of the embodiments shown, that when the artist is finished with his work he may remove the pigment containers 20 and discard the sheet 38, thereby avoiding the necessity for cleaning the palette 10 proper, since the only area covered with paint is the disposable sheet 38, and a fresh sheet 38 may replace it for further use of the palette 10, or 10'

From the foregoing, therefore, it is clearly apparent that the embodiments shown and described are by way of illustration and not of limitation, and that various changes may be made in the construction, composition and arrangement of parts without limitation upon or departure from the spirit and scope of the invention, or sacrificing any of the advantages thereof inherent therein, all of which are herein claimed.

Having described my invention, I claim:

1. An artist palette comprising a flat base integral with a peripheral wall, an overhang extending from a portion of the wall downwardly and inwardly to overlie a portion of the base in parallel, spaced relationship thereto, a liquid-retentive pad disposed upon the base within the wall, including the area beneath the overhang, the overhang and pad provided each with a plurality of corresponding openings, a pigment container seated within each pair of corresponding openings and extending from the surface of the overhang, and a sheet of permeable material disposed across the pad and overhang, and provided with openings therein to expose and surround the pigment containers, the sheet of permeable material having the same configuration as the pad.

2. An artist palette as described in claim 1, the edges of the pad being spaced from the peripheral wall.

3. An artist palette as described in claim 2, the overhang being supported over the base by support members extending from the base.

4. An artist palette as described in claim 2, each of the pigment containers formed intermediately with an annular, tapered apron adapted to abut the overhang to support the container thereon.

5. An artist palette as described in claim 4, the base formed with an intermediate opening provided with an extending wall for insertion of a thumb therethrough, with the base curved inwardly adjacent the opening and adapted to be engaged by the remainder of a hand.

6. An artist palette as described in claim 5, the pad provided with a corresponding opening for insertion of a thumb therethrough.

7. An artist palette as described in claim 6, the wall of the intermediate base opening extending into a ledge adapted to act as a thumb rest.

8. An artist palette as described in claim 4, the portion of the peripheral wall from which the overhang extends being of a height at least equal to the height of the upper edges of the pigment containers.

9. In association with an artist palette as described in claim 8, a flexible sleeve adapted to encase the palette, with one of the inner surfaces of the sleeve in frictional engagement with the wall of the palette.

* * * * *